United States Patent
Okita et al.

(10) Patent No.: US 7,763,307 B2
(45) Date of Patent: Jul. 27, 2010

(54) FISH PASTE MIXTURE WITH RICE BRAN EXTRACT

(75) Inventors: Yuji Okita, Hachioji (JP); Masayuki Nasu, Hachioji (JP); Junko Doshida, Hachioji (JP); Ikuo Kimura, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 1095 days.

(21) Appl. No.: 10/499,302

(22) PCT Filed: Dec. 10, 2002

(86) PCT No.: PCT/JP02/12923
§ 371 (c)(1),
(2), (4) Date: Jun. 18, 2004

(87) PCT Pub. No.: WO03/053162
PCT Pub. Date: Jul. 3, 2003

(65) Prior Publication Data
US 2005/0106311 A1 May 19, 2005

(30) Foreign Application Priority Data
Dec. 20, 2001 (JP) .............................. 2001-388356

(51) Int. Cl.
*A23L 1/28* (2006.01)
(52) U.S. Cl. ........................ 426/655; 426/481; 426/422; 426/490
(58) Field of Classification Search .................. 426/481, 426/655, 442, 490
See application file for complete search history.

(56) References Cited

U.S. PATENT DOCUMENTS 5,308,618 A * 5/1994 Konno et al. ................. 424/750
6,235,517 B1 * 5/2001 Chu et al. ................. 435/252.1

FOREIGN PATENT DOCUMENTS

| JP | 53-62847 | 6/1978 |
| JP | 54-32670 | 3/1979 |
| JP | 63-291531 | * 11/1988 |
| JP | 1-309662 | * 12/1989 |
| JP | 7-67521 | 3/1995 |
| JP | 2001-252031 | 9/2001 |

OTHER PUBLICATIONS

Derwent Database Abstract. Acc No. 2001-457976. CN 1165142. Inventor: Yang.*

* cited by examiner

*Primary Examiner*—Anthony Weier
(74) *Attorney, Agent, or Firm*—Westerman, Hattori, Daniels & Adrian, LLP

(57) ABSTRACT

The components which have suwari-inhibiting action of rice bran extracts is reduced or removed, enabling broader utilization of them for fish paste products. A rice bran extract in which components having specific physiologically active functions are singled out, and these components are reduced or removed. The components are suwari-inhibiting components. The rice bran extract is preferably a water extract. The components are reduced or removed by precipitation or dialysis. The precipitation is calcium precipitation. The suwari-inhibiting components are phytin and/or phytic acid. The rice bran extract can be used as a fish paste additive.

4 Claims, 2 Drawing Sheets

FISH PASTE MIXTURE WITH RICE BRAN EXTRACT

BACKGROUND OF THE INVENTION

1. Field of the Invention

The present invention relates to a rice bran extract whose specific physiologically active functions have been reduced or removed, and to the use thereof in specific applications.

2. Description of the Related Art

Rice bran is known to contain not only minerals, dietary fiber, and other nutrient components but also components having various physiologically active functions. It is known, for example, that γ-orizanol and ferulic acid have antioxidant action, inositol has anti-cholesterolemia action and vitamin B-like action, and phytin and/or phytic acid has metal chelating action or anti-adipohepatic action. Using rice bran in specific foods is expected not only to enhance the nutritional value of these products but also to provide auxiliary effects based on a variety of physiologically active functions. However, since rice bran itself is indigestible, it is more practical to extract specific components contained therein, such as extracting rice oil with hexane or another organic solvent, or extracting phytin and/or phytic acid with an aqueous solution of an organic acid (JP 2001-252031A).

SUMMARY OF THE INVENTION

An object of the present invention is to utilize water-soluble components of rice bran on the whole rather than to concentrate on specific components of rice bran. Another object of the present invention is to use the water-soluble components of rice bran on the whole by placing emphasis solely on specific physiologically active functions and reducing or eliminating these functions.

For example, in the case of using the water-soluble components of rice bran on the whole for production of fish paste product, inhibition of suwari is observed if the water-soluble rice bran extracts is added to prepare salted Alaska Pollack surimi (mince). The term "suwari" refers to the gelation of salted surimi, and the elastic texture of kamaboko and other fish paste products is made possible by this type of gelation. Consequently, any suwari-inhibiting action causes reduction of the unique texture of fish paste products, and therefore severely limits the applicable range of rice bran and rice bran extracts in such fish paste products. An object of the present invention is to reduce or remove the suwari-inhibiting action of rice bran extracts and to make such extracts to be usable on a wider range in fish paste products.

One of the main points of the present invention is to provide a rice bran extract of which components having specific physiologically active functions are singled out, and are reduced or removed.

The aforementioned components are suwari-inhibiting components, in which case the present invention relates to a rice bran extract in which suwari-inhibiting components are singled out and reduced or removed.

In the case of a water extract, the present invention relates to a rice bran water extract in which components having specific physiologically active functions, preferably suwari-inhibiting components, are singled out, and are reduced or removed.

The aforementioned components are reduced or removed by precipitation, preferably calcium precipitation or dialysis, in which case the present invention relates to a rice bran extract, and preferably a water extract of rice bran, in which components having specific physiologically active functions, preferably suwari-inhibiting components, are singled out, and are reduced or removed by precipitation, preferably calcium precipitation or dialysis.

The suwari-inhibiting components are phytin and/or phytic acid, in which case the present invention relates to a rice bran extract, and preferably a water extract of rice bran, in which components having specific physiologically active functions, specifically phytin and/or phytic acid, are singled out and reduced or removed, and this reduction or removal is accomplished as needed by precipitation, preferably calcium precipitation, or dialysis.

Another main point of the present invention is that any one of the extracts hereinbefore described is used as a paste product additive.

DESCRIPTION OF THE PREFERRED EMBODIMENTS

Figure 1:
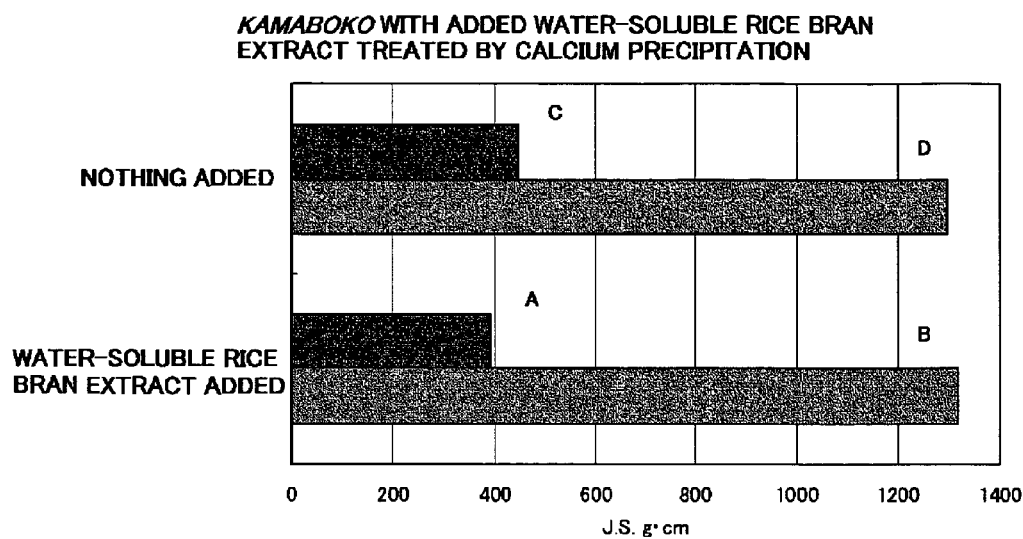
FIG. 1 is a diagram depicting the results of measuring the jelly strength of the kamaboko which was added or not added water-soluble rice bran extracts that have been treated by calcium precipitation.

In the present invention, "rice bran" refers to the materials containing pericarp, seed coats, aleurone layers, and embryo buds produced by a process of producing polished rice from unpolished rice. In addition to raw bran produced by rice polishing, roasted bran produced by roasting raw bran, and defatted bran resulting from the production of rice oil from raw bran, may be used as the rice bran (starting material) for the water extract.

Water is a preferred extracting solvent for rice bran, but it is also acceptable to use a mixture of water and an organic solvent such as ethanol, which is an approved food additive. There are no particular restrictions on the temperature of the extracting solvent. There are also no particular restrictions on the pH of the extracting solvent, although ultimately neutralizing the solvent to a pH of 6 to 8 is desirable in view of its use in fish paste products.

As a calcium salt to be used in calcium precipitation, calcium hydroxide, calcium carbonate, and calcium chloride, for example, which are approved as food additives, are all acceptable, preferably calcium chloride will be used because of its high water solubility. The insoluble precipitates produced by these calcium salts may be removed by centrifugation or filtration.

A membrane of which molecular weight cut off is 10,000 or less is recommended as the dialysis membrane to be used in dialysis.

The water-soluble rice bran extract thus obtained may be mixed in liquid form with a fish paste product, but it is also acceptable to use a powder that has been pulverized by freeze drying or spray drying. These rice bran extracts are subjected to contact treatment such as the adding and kneading during the production of fish paste products, and surimi or fish paste products are produced as usual.

The suwari phenomenon is recognized as a process in which actomyosin, the salt-soluble protein, forms cross-links between molecules by heat, a netlike structure is formed, and water is entrapped within the netlike structure. The presence of S-S bonds is related to the crosslinking process, and intermolecular covalent bonds formed by transglutaminase are also involved. Suwari is basically a gelation phenomenon observed at temperatures of 40° C. or less, and the strength of the gel resulting from suwari differs depending on the way of heating. The rate of suwari increases at higher temperatures, but the strength of suwari increases with longer standing at low temperatures. Sodium ascorbate, for example, is commonly known as a material that oxidizes the SH group and accelerates suwari, and oligosaccharides such as glucose and sucrose, for example, are known to inhibit suwari.

In the case of rice bran extracts, removing phytin and/or phytic acid eliminates most of the suwari-inhibiting action. Most of the suwari-inhibiting action is eliminated in fish paste product additives composed of rice bran extracts in which specific physiologically active functions (specifically, phytin and/or phytic acid) have been reduced or removed.

EXAMPLES

The present invention is described in detail through examples, but the present invention is in no way limited by these examples.

Example 1

Water-soluble Rice Bran Extract Treated by Calcium Precipitation

Water (5 L) was added to 1 kg of raw bran. The mixture was stirred for 1 hour at room temperature, and centrifuged to yield the supernatant. The supernatant was heated for 30 minutes at 80° C., and the resulting insolubles were removed by centrifugation, yielding a transparent water-soluble rice bran extract solution. The pH at this point was 6.5. When calcium chloride was added to the extract solution until the pH was lowered to 5, the extract solution again yielded insolubles and became cloudy. When the insolubles were removed by centrifugation and the extract solution was neutralized with sodium hydroxide to return the pH to 6.5, the extract solution again yielded insolubles and became cloudy, and these insolubles were also removed by centrifugation, yielding a transparent extract solution. This extract solution was freeze-dried, yielding 113 g of water-soluble rice bran extract.

Next, Alaska Pollack (*Theragra chalcogramma*) was used as a raw material, and frozen surimi was produced by a common surimi production method. That is, the meat was separated, washed, dehydrated, kneaded with sugar and phosphate, and frozen. The surimi was thawed; 30 weight % of water, 3 weight % of sodium chloride, and 3 weight % of water-soluble rice bran extract were each added; and the resulting mixture was ground and stuffed into polychlorinated vinylidene tubes. Kamaboko A was prepared by being heated for 40 minutes at 90° C., and kamaboko B was prepared by being heated first for 60 minutes at 30° C. and then for 40 minutes at 90° C. The heating conditions of B were designed to further accelerate the suwari process. For the sake of comparison, control kamaboko C (40 minutes at 90° C.) and D (60 minutes at 30° C., then 40 minutes at 90° C.) were prepared under the same conditions except that the water-soluble rice bran extract was not added.

The jelly strength of the four kamabokos thus obtained was measured. The jelly strength, expressed as J. S. (g·cm), was calculated by multiplying the breaking strength (w-value in g) and the breaking strain (L-value in cm) which are obtained by measuring the cutting kamabokos into round slices 2.5 cm long with a rheometer using a spherical plunger of 5 mm in diameter. The results are shown in FIG. 1.

It can be seen in FIG. 1 that the water-soluble rice bran extract treated by calcium precipitation did not affect the jelly strength of the kamabokos, nor did it inhibit suwari, even under conditions of accelerated suwari.

Comparative Example 1

Water-soluble Rice Bran Extract Not Treated to Remove Suwari-Inhibiting Components Water (5 L) was added to 1 kg of raw bran. The mixture was stirred for 1 hour at room temperature, and centrifuged to yield the supernatant. The supernatant was heated for 30 minutes at 80° C., and the resulting insolubles were removed by centrifugation, yielding a transparent water-soluble rice bran extract solution. This extract solution was freeze-dried, yielding 121 g of water-soluble rice bran extract.

Using this water-soluble rice bran extract, kamabokos E (heated for 40 minutes at 90° C.) and F (heated for 60 minutes at 30° C., then for 40 minutes at 90° C.) were prepared under the same conditions as in Example 1. The heating conditions of F were designed to further accelerate the suwari process. For comparison, control kamabokos C (40 minutes at 90° C.) and D (60 minutes at 30° C., then 40 minutes at 90° C.) were prepared under the same conditions except that the water-soluble rice bran extract was not added.

Figure 2:
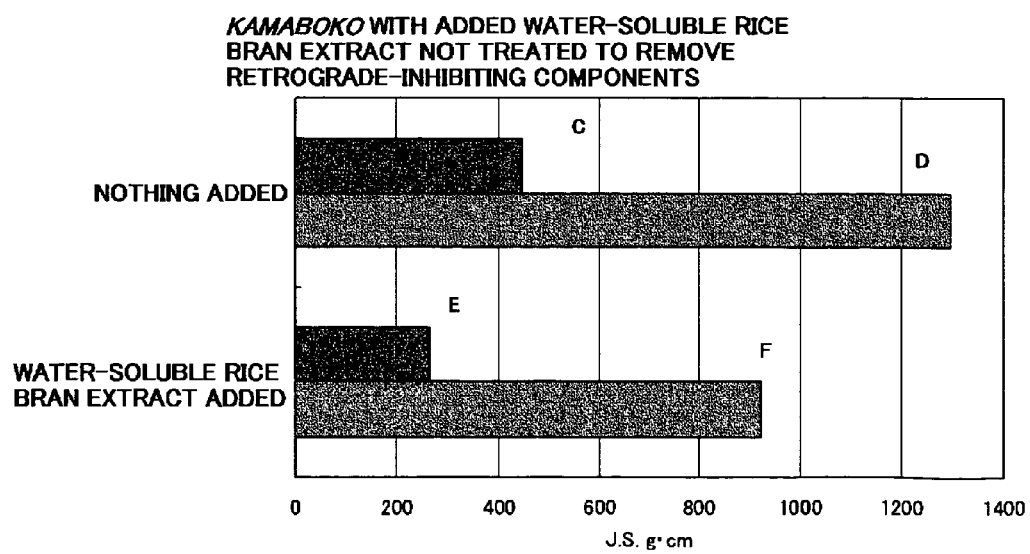
FIG. 2 is a diagram depicting the results of measuring the jelly strength of the kamaboko which is added or not added water-soluble rice bran extracts that have not been treated to remove suwari-inhibiting components.

The results of measuring the jelly strength of the four kamabokos thus obtained are shown in FIG. 2. It can be seen in FIG. 2 that the water-soluble rice bran extract not treated by calcium precipitation had an effect on the jelly strength of the kamabokos and considerably inhibited suwari, especially when suwari was accelerated by heating.

Comparative Example 2

Water-soluble Rice Bran Extract Treated by Acid Precipitation

Water (5 L) was added to 1 kg of raw bran. The mixture was stirred for 1 hour at room temperature, and centrifuged to yield the supernatant. The supernatant was heated for 30 minutes at 80° C., and the resulting insolubles were removed by centrifugation, yielding a transparent water-soluble rice bran extract solution. The pH at this point was 6.5. When hydrochloric acid was added to the extract solution until the pH was lowered to 5, the extract solution again yielded insolubles and became cloudy. The insolubles were removed by centrifugation and the extract solution was neutralized with sodium hydroxide to return the pH to 6.5, yielding a transparent extract solution. This extract solution was freeze-dried, yielding 113 g of water-soluble rice bran extract.

Using this water-soluble rice bran extract, kamabokos G (heated for 40 minutes at 90° C.) and H (heated for 60 minutes at 30° C., then for 40 minutes at 90° C.) were prepared under the same conditions as in Example 1. The heating conditions of H were designed to further accelerate the suwari process. For the sake of comparison, control kamabokos C (40 minutes at 90° C.) and D (60 minutes at 30° C., then 40 minutes at 90° C.) were prepared without adding the water-soluble rice bran extract.

Figure 3:
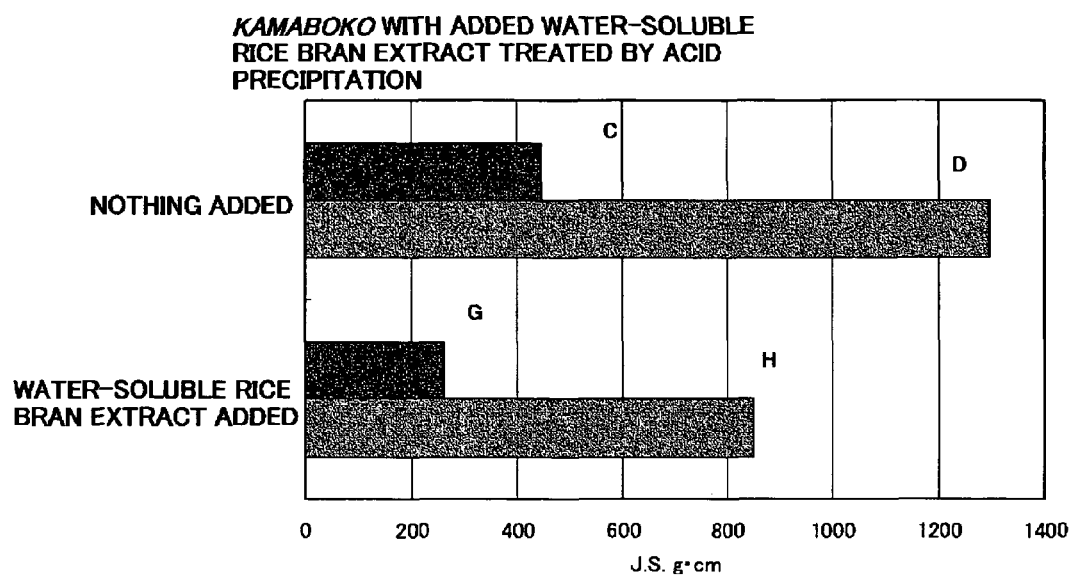
FIG. 3 is a diagram depicting the results of measuring the jelly strength of the kamaboko which is added or not added water-soluble rice bran extracts that have been treated by acid precipitation.

The results of measuring the jelly strength of the four kamabokos thus obtained are shown in FIG. 3. It can be seen in FIG. 3 that unlike the water-soluble rice bran extract treated by calcium precipitation, the water-soluble rice bran extract treated by acid precipitation had an effect on the jelly strength of the kamabokos and considerably inhibited suwari, especially when suwari was accelerated by heating.

Example 2

Water-soluble Rice Bran Extract Treated by Dialysis

Water (5 L) was added to 1 kg of raw bran. The mixture was stirred for 1 hour at room temperature, and centrifuged to yield the supernatant. The supernatant was heated for 30 minutes at 80° C., and the resulting insolubles were removed by centrifugation, yielding a transparent water-soluble rice bran extract solution. This extract solution was treated by dialysis in a dialysis tube (Cellophane Tube, Nacalai Tesque, Inc., fractional molecular weight: 8,000). The resulting solution in the tube was freeze-dried, yielding 47 g of water-soluble rice bran extract.

Using this water-soluble rice bran extract, kamabokos I (heated for 40 minutes at 90° C.) and J (heated for 60 minutes at 30° C., then for 40 minutes at 90° C.) were prepared under the same conditions as in Example 1, except that the amount of water-soluble rice bran extract added to the surimi was 1.2% by weight. The heating conditions of J were designed to further accelerate the suwari process. For the sake of comparison, control kamabokos C (40 minutes at 90° C.) and D (60 minutes at 30° C., then 40 minutes at 90° C.) were prepared without adding the water-soluble rice bran extract.

Figure 4:
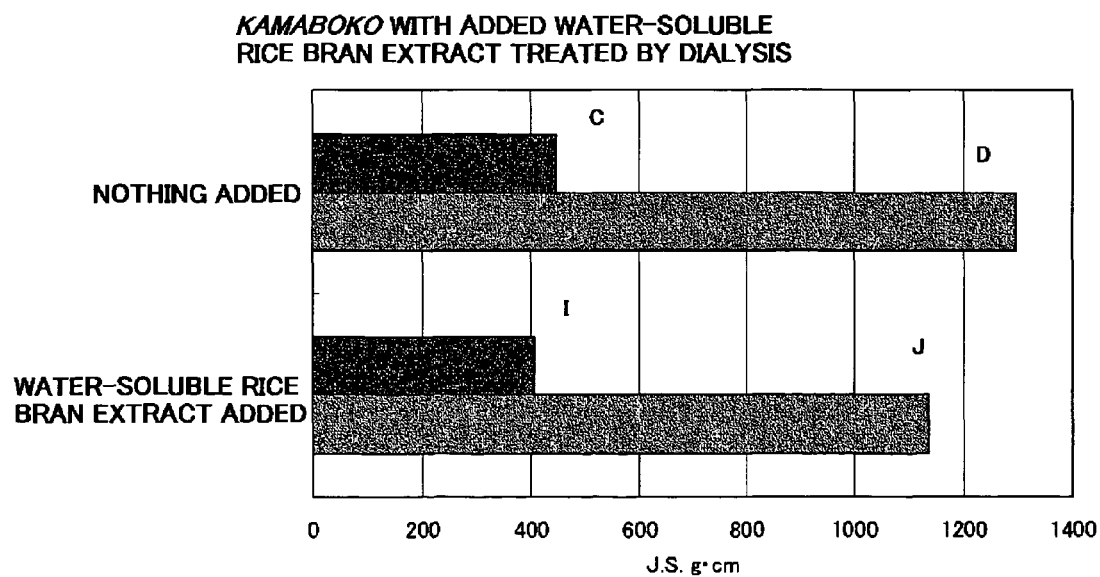
FIG. 4 is a diagram depicting the results of measuring the jelly strength of the kamaboko which is added or not added water-soluble rice bran extracts that have been treated by dialysis.

The results of measuring the jelly strength of the four kamabokos thus obtained are shown in FIG. 4. It can be seen in FIG. 4 that although suwari was inhibited somewhat in the kamaboko with added dialyzed water-soluble rice bran extract when compared with the kamaboko with no added extract, inhibition was reduced when compared with the kamaboko with an added water-soluble rice bran extract that had not been dialyzed (FIG. 2).

[Effects]

Because components contained in water-soluble rice bran extracts that inhibit suwari in fish paste products were removed or reduced by calcium precipitation or dialysis, rice bran extracts may be added to fish paste products without inhibiting suwari. It is possible to provide a fish paste product added rice bran extracts.

What is claimed is:

1. A fish paste mixture, comprising:
   fish paste; and
   rice bran extract mixed with said fish paste, wherein the rice bran extract contains neither phytin nor photic acid, or reduced amount of phytin and phytic acid so that phytin and phytic acid do not inhibit suwari of the fish paste.

2. The fish paste mixture according to claim 1, wherein the rice bran extract is a water extract.

3. The fish paste mixture according to claim 1 or 2, wherein said phytin or phytic acid are reduced or removed by precipitation or dialysis.

4. The fish paste mixture according to claim 3, wherein the phytin or phytic acid are reduced or removed by precipitation using calcium.

* * * * *